United States Patent
Berger et al.

(10) Patent No.: US 8,757,006 B2
(45) Date of Patent: Jun. 24, 2014

(54) METHOD AND MEASURING SYSTEM FOR DETERMINING AND/OR MONITORING THE FLOW OF A MEASURED MEDIUM THROUGH A MEASURING TUBE

(75) Inventors: Andreas Berger, Hasel-Glashutten (DE); Achim Wiest, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 489 days.

(21) Appl. No.: 13/055,528

(22) PCT Filed: Jul. 7, 2009

(86) PCT No.: PCT/EP2009/058538
§ 371 (c)(1),
(2), (4) Date: Jan. 24, 2011

(87) PCT Pub. No.: WO2010/009973
PCT Pub. Date: Jan. 28, 2010

(65) Prior Publication Data
US 2011/0174083 A1    Jul. 21, 2011

(30) Foreign Application Priority Data
Jul. 23, 2008   (DE) .................... 10 2008 034 411

(51) Int. Cl.
*G01F 1/20*  (2006.01)
(52) U.S. Cl.
USPC .................. 73/861.18; 73/861.26; 73/861.27
(58) Field of Classification Search
USPC .......... 73/861.25, 861.26, 861.27; 248/229.1, 248/222.51, 222.52
See application file for complete search history.

(56) References Cited

U.S. PATENT DOCUMENTS

| | | | | |
|---|---|---|---|---|
| 4,286,470 A * | 9/1981 | Lynnworth | ................ | 73/861.18 |
| 4,425,803 A * | 1/1984 | Baumoel | ................... | 73/861.18 |
| 4,783,997 A * | 11/1988 | Lynnworth | .................... | 73/644 |
| 2007/0107533 A1 | 5/2007 | Molenaar | | |

FOREIGN PATENT DOCUMENTS

| | | |
|---|---|---|
| DE | 101 47 175 A1 | 4/2003 |
| DE | 10 2007 019 610 A1 | 10/2008 |
| DE | 10 2007 019 689 A1 | 10/2008 |
| DE | 10 2008 033 701 A1 | 1/2009 |
| EP | 1 235 056 A2 | 8/2002 |
| EP | 1 248 081 A1 | 10/2002 |
| EP | 1 291 620 A2 | 3/2003 |

* cited by examiner

*Primary Examiner* — Lisa Caputo
*Assistant Examiner* — Roger Hernandez-Prewit
(74) *Attorney, Agent, or Firm* — Bacon & Thomas, PLLC (57) ABSTRACT

A measuring system for determining and/or monitoring flow of a measured medium through a measuring tube, wherein the measuring system includes: at least one control/evaluation unit, which, based on ultrasonic measurement signals, or based on measurement data derived from the ultrasonic measurement signals, ascertains volume, and/or mass, flow of the measured medium flowing in the measuring tube; and a sensor housing, which surrounds a first ultrasonic sensor and at least a second ultrasonic sensor. At least the first ultrasonic sensor is seated shiftably in the sensor housing; wherein the measuring system further includes a sensor holder, which is securable on the measuring tube and includes a securement mechanism for the releasable securement of the sensor housing on the sensor holder. The sensor housing forms with the ultrasonic sensors a unit securable on the sensor holder and releasable from the sensor holder.

12 Claims, 5 Drawing Sheets

METHOD AND MEASURING SYSTEM FOR DETERMINING AND/OR MONITORING THE FLOW OF A MEASURED MEDIUM THROUGH A MEASURING TUBE

TECHNICAL FIELD

The present invention relates to a measuring system for determining and/or monitoring flow of a measured medium through a measuring tube, wherein the measuring system includes: at least one control/evaluation unit, which, based on ultrasonic measurement signals, or based on measurement data derived from the ultrasonic measurement signals, ascertains volume, and/or mass, flow of the measured medium flowing in the measuring tube; and at least two ultrasonic sensors, wherein at least a first ultrasonic sensor is seated shiftably in a sensor housing. The present invention additionally relates to a corresponding method for mounting such a measuring system.

BACKGROUND DISCUSSION

Ultrasonic flow measuring devices are often applied in process and automation technology. They permit volume flow and/or mass flow in a pipeline to be determined in a simple manner.

Known ultrasonic flow measuring devices frequently work according to the Doppler principle or according to the travel time difference principle. In the travel time difference principle, the different travel times of ultrasonic pulses are evaluated relative to the flow direction of the liquid. For this, ultrasonic pulses are sent at a particular angle to the tube axis both in the direction of the flow as well as also counter to the flow. From the travel-time difference, the flow velocity, and therewith, in the case of a known diameter of the pipeline section, the volume flow, can be determined.

In the case of the Doppler principle, ultrasonic waves with a particular frequency are coupled into the liquid, and the ultrasonic waves reflected by the liquid are evaluated. From the frequency shift between the in-coupled and reflected waves, the flow velocity of the liquid can likewise be determined.

Reflections in the liquid occur, however, only when small air bubbles or impurities are present, so that this principle is mainly put to use in the case of contaminated liquids.

The ultrasonic waves are produced and received with the assistance of so-called ultrasonic transducers. These are fixedly placed on the tube wall of the relevant pipeline section. More recently, clamp-on ultrasonic flow measuring systems are also obtainable. In the case of these systems, the ultrasonic transducers are only pressed onto the tube wall with a clamp. Such systems are known, for example, from EP 686 255 B1, U.S. Pat. Nos. 4,484,478 or 4,598,593. A further ultrasound flow measuring device, which works according to the travel time difference principle, is known from U.S. Pat. No. 5,052,230. The travel time is, in this case, ascertained by means of short ultrasonic pulses.

A great advantage of clamp-on ultrasound flow measuring systems is that they do not contact the measured medium and they can be placed on an already existing pipeline. Disadvantageous is a high effort needed when mounting the clamp-on systems to orient the individual ultrasonic transducers with respect to each other, such depending on many parameters, e.g. tube wall thickness, tube diameter, and velocity of sound in the measured medium.

The ultrasonic transducers normally comprise an electromechanical transducer, in industrial process measurements technology, most often a piezoceramic; and a coupling layer, also called a coupling wedge or, less frequently, a lead-in element. The coupling layer is, in such case, most often manufactured from synthetic material, e.g. plastic. In the electromechanical transducer element, the ultrasonic waves are produced, and led via the coupling layer to the tube wall, and from there, guided into the liquid. Since the velocities of sound in liquids and synthetic materials are different, the ultrasonic waves are refracted during the transition from one medium to another. The angle of refraction is determined in a first approximation according to Snell's law. The angle of refraction is thus dependent on the ratio of the propagation velocities in the media.

Between the piezoelectric element and the coupling layer, another coupling layer can be arranged, a so-called adapting or matching layer. The adapting or matching layer performs, in such case, the function of transmission of the ultrasonic signal, and simultaneously the reduction of reflection off interfaces between two materials caused by different acoustic impedances.

U.S. Pat. No. 6,397,683 B1 shows two clamp-on ultrasonic sensors which are securable on a pipeline by means of two affixing bands. For adjusting the spacing of the two sensors, at least one sensor of the pipeline is to be loosened. Its affixing band is likewise to be loosened. Both of these are to be fixed anew after a new orienting. The coupling element of one of the ultrasonic sensors, together with the piezoelectric ultrasound transducer element placed on it, is seated resiliently in a housing.

U.S. Pat. No. 5,131,278 shows a possible embodiment for shiftably seating two ultrasonic transducers on a track, which is mountable fixedly on the measuring tube. A track for the shiftable securement of ultrasonic sensors is likewise presented in EP 1 396 707 A1 and EP 1 840 528 A2. The sensors are, in such case, mounted resiliently in the track.

Described in EP 1 783 464 A2 is a guide frame as sensor holding system, which is securable on the measuring tube by means of two securement systems. A housing is placed over this for protection of the sensors. For maintenance and for shifting the sensors, the housing must be removed.

All these documents share the common characteristic that the sensors are shiftable during measurement operation. The holding apparatuses are, in such case, embodied in such a manner, that, after their securement on the measuring tube, the sensors are shiftable into the desired position. In order to protect the sensors from mechanical influences from outside, protective housings, in part to be applied separately, are provided.

SUMMARY OF THE INVENTION

An object of the invention is to provide a flow-measuring system, which is very simple to assemble and to adjust, wherein the ultrasonic sensors are well protected against tampering.

The object is achieved by a measuring system for determining and/or monitoring flow of a measured medium through a measuring tube, wherein the measuring system includes: At least one control/evaluation unit, which, based on ultrasonic measurement signals, or based on measurement data derived from the ultrasonic measurement signals, ascertains volume, and/or mass, flow of the measured medium flowing in the measuring tube; and a sensor housing, which surrounds a first ultrasonic sensor and at least a second ultrasonic sensor; wherein at least the first ultrasonic sensor is seated shiftably in the sensor housing; wherein the measuring system further includes a sensor holder, which is securable on the measuring tube and includes a securement mechanism for the releasable securement of the sensor housing on the sensor holder; wherein the sensor housing forms with the ultrasonic sensors a unit securable on the sensor holder and releasable from the sensor holder.

The sensor housing containing the two ultrasonic sensors is, especially, force, and/or shape, interlockedly, releasably connectable with the sensor holder. Following mounting of the sensor housing on the sensor holder, no additional mounting—and/or adjusting of the ultrasonic sensors is necessary.

The sensor housing is so orientable on the sensor holder, that the ultrasonic sensors are positionable on the measuring tube in predeterminable positions. The first ultrasonic sensor is especially shiftable in the direction of the longitudinal axis of the measuring tube. This can simultaneously represent the longitudinal axis of the sensor housing. Involved here is a clamp-on measuring system.

The measuring system can, in such case, be so embodied, that the ultrasonic sensors in the sensor housing are secured against shifting simultaneously with the mounting of the sensor housing on the sensor holder. For example, the ultrasonic sensors are pressed with a predeterminable force onto the measuring tube, which does not enable the user to shift the sensors force freely, since, among other things, also the housing prevents access to the sensors.

In a preferred embodiment of the invention, the ultrasonic sensors in the mounted state of the sensor housing on the sensor holder are not accessible to the user from the exterior, i.e. from outside the housing. They are, thus, protected against coarse mechanical, external influences, such as e.g. damage by the operating personnel.

In a preferred variant of the invention, the flow is ascertainable with a travel-time difference method or a Doppler method. In an advantageous further development of the measuring system of the invention, the sensor housing includes on a sensor housing wall facing the measuring tube a window, through which at least the first ultrasonic transducer protrudes at least partially from the sensor housing.

The sensor housing surrounds the ultrasonic sensors on at least five sides, or from at least five spatial directions. In the sixth side of the sensor housing, which, in the mounted state, usually faces in the direction of the measuring tube, there is a narrow window. Through this window, the ultrasonic sensors are acoustically coupled with the measuring tube. In such case, an ultrasonic sensor in the sensor housing can have, in the direction of the window width, a larger size than the width of the window.

A very advantageous further development of the measuring system of the invention provides that a seal is arrangeable between the measuring tube and sensor housing, on the sensor housing wall facing the measuring tube. Usually, in the case of a clamp-on ultrasonic sensor, coupling grease is placed between ultrasonic sensor and measuring tube. This is, most often, not protected against weathering. Thus, measurement disturbances due to lacking or defective coupling grease can often occur, and the maintenance intervals can be very short. A seal between the sensor housing and measuring tube protects the coupling grease against drying out, evaporation, direct solar radiation, water or other weathering.

Preferably, the seal, as sealing lip, is placed around the window through which at least the first ultrasonic sensor protrudes. In such case, the most varied of embodiments and materials can be used. Any type of O-rings known to be used for sealing purposes can be used, or a simple layer of sealing silicone can be applied.

In an additional embodiment, the seal between the measuring tube and sensor housing is electrically conductive and/or electrically conductively coated. If the sensor housing is made from metal and/or is conductively coated, the ultrasonic sensor can receive electromagnetic disturbances from the outside through the window. If the measuring tube is likewise manufactured from metal and/or conductively coated, a better shielding against electromagnetic disturbances can be achieved with a conductive and/or conductively coated seal. In this regard, a synthetic material, e.g. plastic, seal could be conductively coated, e.g. with a spray. Equally, a plastic measuring tube can, at least on the area surrounded by the seal, be electrically conductively coated. Together with the likewise conductive and/or conductively coated sensor housing, a Faraday cage is thus formed.

Another advantageous further development of the measuring system of the invention provides that the sensor housing has on the sensor housing wall facing the measuring tube, between sensor housing wall and measuring tube, at least one stop, which, in the mounted state of the measuring system, lies against the measuring tube and defines between sensor housing wall and measuring tube a distance h, up to which distance h the seal between sensor housing wall and measuring tube is compressible.

The sensor housing is composed, for example, of a tubular middle part, e.g. a square or rectangular tube, with initially open ends. These ends are sealed by end caps. The end caps extend a distance beyond a certain side of the sensor housing, especially the side facing the measuring tube in the mounted state. Thus, the end caps form the stop, which, in the mounted state, lies against the measuring tube and defines the distance h between measuring tube and the measuring tube facing side of the sensor housing. Distance h thus corresponds to the distance with which the end caps extend beyond the side facing the measuring tube in the mounted state.

The ultrasonic sensors themselves represent an alternative means of forming the stop. If the sensors are resiliently seated in the sensor housing, they can then be pushed in the direction of the interior of the sensor housing. A limiting of this compressing can provide a protrusion of the ultrasonic sensors beyond the side of the sensor housing facing the measuring tube in mounted state of the measuring system, which protrusion especially has the predeterminable height h and, thus, limit a compression of the surrounding seal to h.

A very advantageous further development of the solution of the invention provides that the sensor housing has on the sensor housing wall facing the measuring tube, between sensor housing wall and measuring tube, at least one stop, which, in the mounted state of the measuring system, lies against the measuring tube and defines between sensor housing wall and measuring tube a distance h, up to which at least the first ultrasonic sensor protrudes out from the sensor housing in the mounted state.

If the ultrasonic sensors are seated e.g. resiliently in the sensor housing and compressibly in the direction of the interior of the sensor housing, such that they can be moved in the direction of the interior of the sensor housing, this movement can be limited by a stop. If the sensors in the non-installed state lie with a distance larger than h beyond the side of the sensor housing facing the measuring tube in the installed state of the measuring system, the protrusion in the installed state of the measuring system can then be limited to the height h of the stop, which, for example, is formable from at least one end cap of the sensor housing, and, in the installed state, lies against the measuring tube.

In an advantageous further development of the measuring system of the invention, it is provided that the sensor holder has a first functional surface for orientation of the sensor holder on the measuring tube. Furthermore, the sensor holder includes advantageously at least a second functional surface for orientation of the sensor housing on the sensor holder.

In the case of a very advantageous further development of the invention, the sensor holder is mountable with a definable first force on the measuring tube and the sensor housing is mountable with a definable second force independent of the first force. The second force is introducible via the securement mechanism between sensor holder and sensor housing at the measuring tube.

The first force acts between measuring tube and sensor holder. The sensor holder is, for example, pressed with the first force onto the measuring tube. The second force acts between measuring tube and sensor housing. This second force is especially applicable via the sensor holder and/or the securement mechanism onto the sensor housing. Thus, for example, the sensor holder is pressed by means of clamping hangers onto the measuring tube with the first force and the sensor holder introduces together with the securement mechanism the second force, which is smaller than the first force, onto the sensor housing in the direction of the measuring tube and so presses the sensor housing onto the measuring tube.

In the case of resiliently seated ultrasonic sensors and with a sensor housing equipped with stop means, also the ultrasonic sensors themselves are pressable with a definable force onto the measuring tube. Especially, then the force, which especially is applied via the sensor holder and/or the securement mechanism onto the sensor housing, with which the sensor housing is securable onto the measuring tube, is larger than the force with which an ultrasonic sensor is pressed against the tube.

In the case of an additional advantageous further development of the invention, at least the first ultrasonic sensor, shiftable in the sensor housing, is, in the case of the securing of the sensor housing on the sensor holder, securable against shifting.

Simultaneously with the actuating of the securement mechanism, thus, the ultrasonic sensors are secured in the sensor housing against shifting. Shifting, against which the ultrasonic sensors are securable, can arise e.g. through vibrations.

The ultrasonic sensors can be secured against shifting in many different ways. Some alternatives will now be presented in brief in the following.

A option is resilient seating of the shiftable first ultrasonic sensor. The spring is, in such case, preferably arranged between the ultrasonic sensor, which is at least partially supportable by a first inner surface of the sensor housing, and a guide hanger, which at least partially contacts the second inner surface lying opposite the first inner surface supporting the ultrasonic sensor. The guide hanger forms together with the second inner surface a working surface pair, between which working surfaces friction arises, in the case of attempting to shift the ultrasonic sensor in the sensor housing, thus we have here. so to speak, a friction surface pair. The spring force, or the spring constant, the deflection of the spring and the surface characteristics of the individual working surfaces determine the force required to shift the guide hanger, together with the spring and the ultrasonic sensor, in the sensor housing. Now, this can be so designed, that the ultrasonic sensor is shiftable in the not mounted state very easily by hand and that the ultrasonic sensor is secured against shifting in the mounted state.

Other options to secure the ultrasonic sensor against shifting include e.g. cograil like bumps and hollows directed at one another on an ultrasonic sensor facing side of a guide hanger of a resiliently seated ultrasonic sensor and on the side of the ultrasonic sensor facing away from the measuring tube, which in the mounted state of the measuring system engage in one another and secure the ultrasonic sensor against shifting, similarly to the previously described, frictional interlocking, and here as shape interlocking engagement, or various clamping mechanisms, such as a window, in which the ultrasonic sensor is guided, wherein the window, in the case of actuating of the securement mechanism, narrows and clamps, and, thus, secures, the ultrasonic transducer.

In an especially preferred embodiment of the invention, the spring force and the friction surface pairing, formed from the first inner surface of the sensor housing and the thereto abutting area of the coupling element, are so designable, that the ultrasonic sensor, in the not mounted state, is shiftable by hand and/or the spring force and the friction surface pairing, formed from the second inner surface of the sensor housing and the thereto abutting area of the guide hanger, are so designable, that the ultrasonic sensor, in the not mounted state, is not shiftable by hand. The ultrasonic sensor is, for example, both in the installed state, as well as also in the non-installed state, securable in the sensor housing at least against a force of twice the acceleration of gravity times the weight of the ultrasonic sensor itself in the direction of an axial shifting in the sensor housing. In the installed state, the force, against which the sensor is securable, can also be far higher.

In an additional advantageous further development of the solution of the invention, the sensor holder has 1) the shape of a sheet metal securement with prismatic cavity on the side facing the measuring tube for the orientation of the sensor holder on the measuring tube and 2) a centrally arranged cavity and straps lateral thereto for accommodating and for orientating the sensor housing on the measuring tube.

The prismatic cavity is preferably placed on a central axis on the sensor holder on the side of the sensor holder facing the measuring tube and serves as a functional surface for orienting the sensor holder on the measuring tube, parallel to a generatrix of the measuring tube. This cavity is easily manufacturable by bending of the sheet metal securement.

Such a sensor holder is applicable for different measuring tube diameter. However, sensor holders with special sizes and/or forms for various tube diameters are also manufacturable.

An advantageous further development of the measuring system of the invention provides that the securement mechanism includes 1) a leaf spring, which is an integral component of the sensor holder or which is connectable with the sensor holder, and 2) a clamping hanger, which is seated rotatably on the sensor housing and has an eccentric cutout, wherein, by engagement of the eccentric cutout in the leaf spring, upon rotation of the clamping hanger, a force is exertable on the sensor housing in the direction of the measuring tube. The cutout is, in such case, especially, eccentric to the rotational axis of the clamping hanger.

Additionally, the object of the invention is achieved by a method for mounting the measuring system of the invention, wherein the sensor holder is placed on the measuring tube and then the already preassembled sensor housing with therein preadjusted ultrasonic sensors is oriented on the sensor holder and then secured.

If the sensor holder is embodied as a piece of sheet metal and the securement mechanism includes a leaf spring on the sensor holder and a clamping hanger rotatably seated on the sensor housing, first the sheet metal piece is mounted on the measuring tube and then the already preassembled sensor housing with therein preadjusted ultrasonic sensors is oriented on the sensor holder and secured against the measuring tube by rotating the clamping hanger, whose eccentric cutout engages with the leaf spring.

In an advantageous further development of the method of the invention, simultaneously with the securement of the sensor housing on the sensor holder, at least the shiftable first ultrasonic sensor is secured against shifting.

A great problem of previous clamp-on measuring systems is maintenance of the sensors and the replacement of coupling grease between measuring tube and ultrasonic sensor. An advantage of this solution is that the sensor housing, including ultrasonic sensors, is securable, respectively releasable, on the measuring tube with, in each case, one hand movement. Until now, the sensors were mounted on the measuring tube at the same time with an open track guiding them. Then, the adjustment of the sensors was done. Here, the adjusting of the sensors is decoupled from the mounting of the housing and the sensors are protected by the housing from external influences. The sensors are, thus, protected during operation of the measuring system against adjusting and therewith against tampering. In case, during operation and/or in the mounted state of the measuring system, i.e. sensor housing applied on the measuring tube, a shifting at least of the first ultrasonic sensor is detected, or such is detectable and/or a releasing of sensor housing from the sensor holder or an opening of the securement mechanism, an alarm signal is issuable. The measuring system is so embodied to detect a shifting of at least the first ultrasonic sensor and/or a loosening of the sensor housing from the sensor holder or an opening of the sensor housing.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
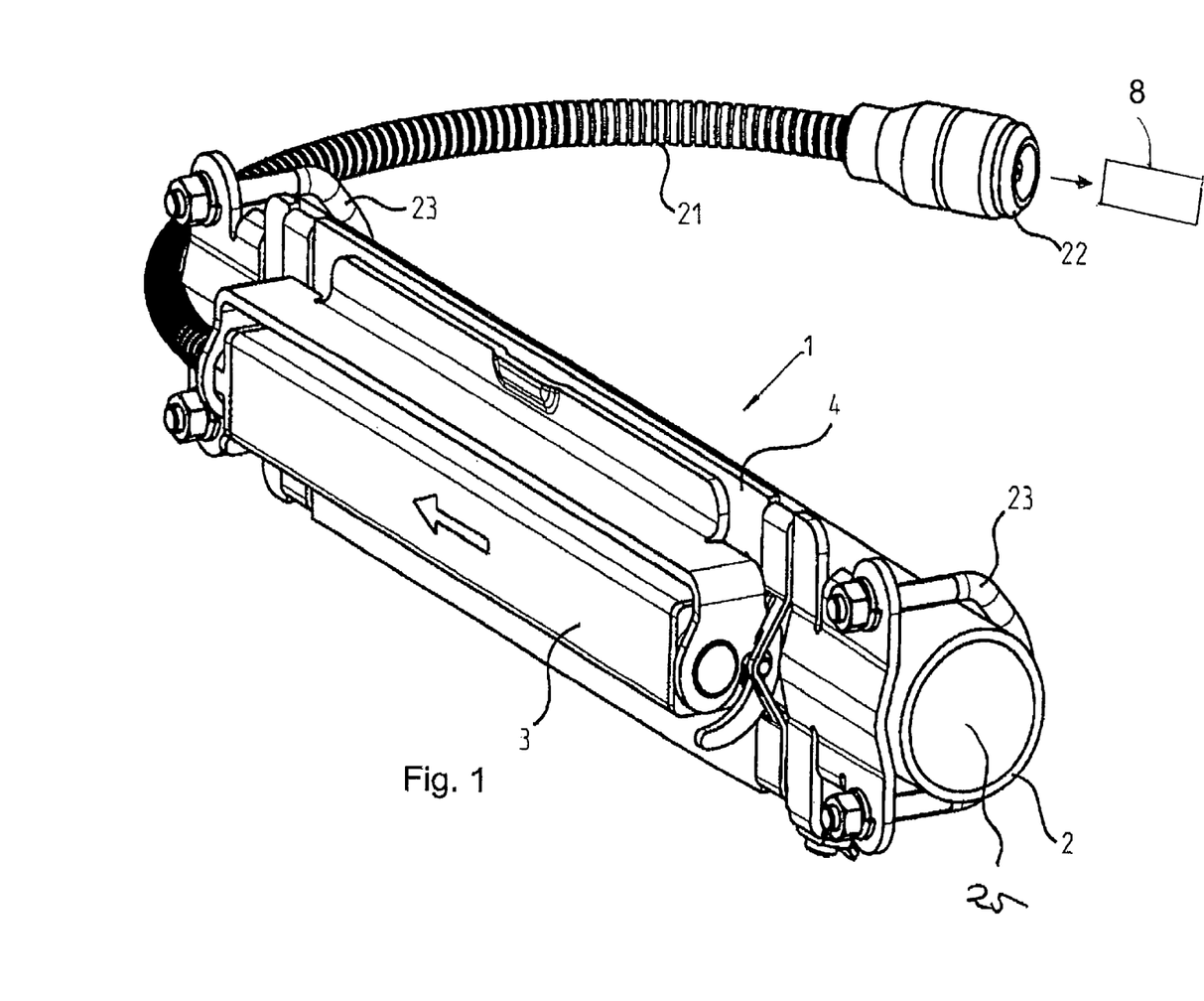
FIG. 1 shows perspectively, a measuring system of the invention mounted on a measuring tube.

FIG. 1 shows a measuring system 1 mounted on a measuring tube 2. Measuring system 1 comprises a sensor housing 3 and a sensor holder 4. The ultrasonic sensors are surrounded by the sensor housing 3 and lie with their surfaces for coupling sound in or out on the measuring tube. Therefore, they are not seen in this drawing. This shows, however, that the ultrasonic sensors are not accessible to the user from the outside, and are therewith not shiftable, and that they are well-protected against mechanical influences from the outside. Leading away from the sensor housing 3 is a connection cable 21 with a connection plug 22 for connection of the ultrasonic sensors to a control/evaluation unit 8. The sensor holder 4 is tightly clamped with U-bolts 23 onto the measuring tube 2. The U-bolts 23 can be made of plastic material with a spring action, or, as presented here, from a relatively form-stable steel. They are connected via screw connections with the sensor holder 4.

Figure 2:
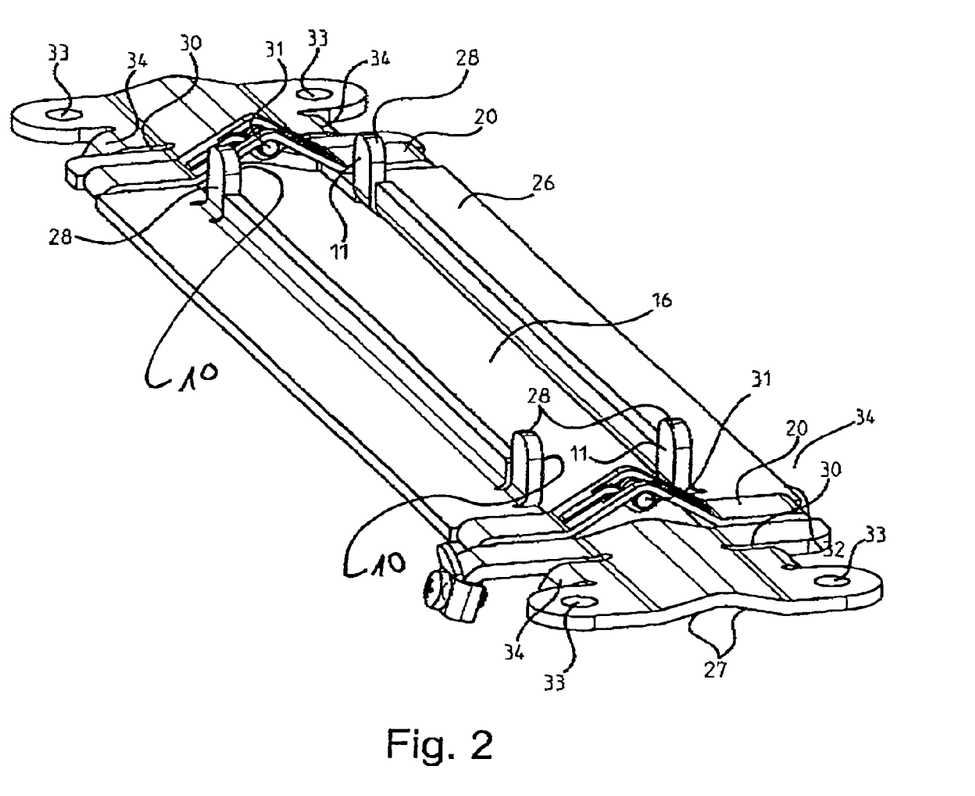
FIG. 2 shows perspectively, a sheet metal piece as sensor holder.

Through the special design of the sensor holder 4, the measuring tube 2 is not deformed by the necessary clamping force of the U-bolts 23. The sensor holder 4 is embodied as a metal securement sheet 26, which has a slit 30 for force isolation between a region for accommodating the sensor housing 3 and a region 32 for accommodating the securement means. The securement means comprise the U-bolts 23. The regions 32 for accommodating the securement means have bores for securement of the U-bolts, and guides 34 for guiding the clamping bands. Both regions enable the securement of the metal securement sheet 26 on the measuring tube by means of certain forces. The regions protrude, in such case, somewhat out from the surfaces 10 of the sensor holder 4 abutting on the measuring tube 2, i.e. the edges of the clamping band guides 34 and the bores 33 for accommodating the U-bolts 23 do not contact the measuring tube 2, and offer, consequently, a certain spring action. Thus, for example, forces which could deform the pipe, which, for example, are erroneously applied during installation via the tightening torque of the U-bolts 23 or the tension of the clamping bands 24, are absorbed by the metal securement sheet and, consequently, only transmitted to the pipe in a lessened degree. The metal securement sheet 26 offers a certain flexibility and elasticity. By the slits 30, this elasticity is, on the one hand, increased, and, on the other hand, the forces for securement of the sensor holder 26 to the measuring tube 2 are decoupled from the securement mechanism for securement of the sensor housing to the measuring tube 2. The slits 30 extend, in such case, preferably from the edges of the metal securement sheet up to the surfaces of the metal securement sheet in contact with the measuring tube 2.

Additionally, the metal securement sheet 26 includes, besides the prismatic cavity 27, which serves as a first functional surface for orientation of the sensor holder 4 or of the metal securement sheet 26 on the measuring tube 2, a second functional surface for orientation of the sensor housing 3 on the sensor holder 4 or on the measuring tube 2. Serving here as second functional surfaces are the lugs 28. The sensor housing 3 is placed between the lugs 28 of the sensor holder, in this case, the metal securement sheet 26. Through the window 16 in the sensor holder 26 which lies between the lugs 28, the sensor housing 3 comes in contact with the measuring tube 2. Via a leaf spring 20 with a pin 31, the sensor housing 3 is secured on the metal securement sheet 26. The leaf spring 20 with the pin 31 forms the first part of the securement mechanism 9. The clamping hanger 17 seated rotatably on the sensor housing 3 is a further part of the securement mechanism 9. The leaf spring 20 can, in such case, be an integral component of the sensor holder, or, as is the case here, be a part secured onto the sensor holder 4. The pin 31 is, in this case, likewise connected with the leaf spring 20 in a material-bonded, shape-interlocking or force-retaining (e.g. frictionally) manner.

Figure 3:
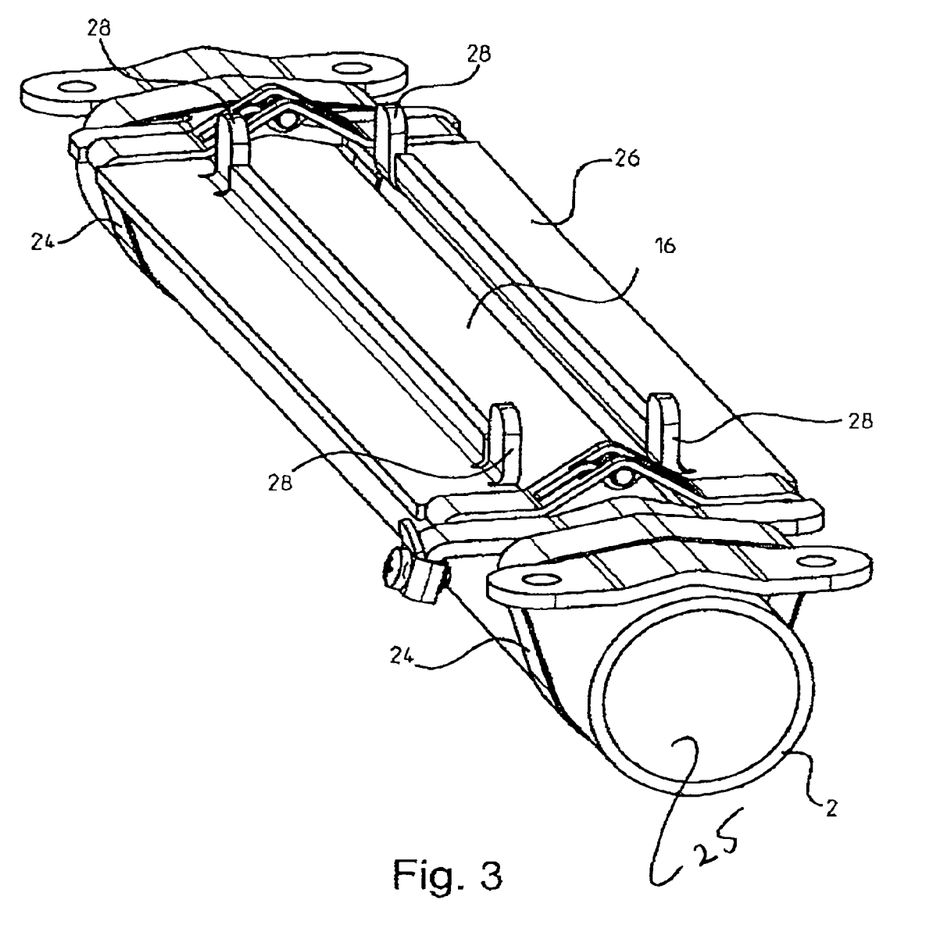
FIG. 3 shows perspectively, a sensor holder mounted on a measuring tube.

FIG. 3 shows a measuring tube 2 with mounted sensor holder 4. The sensor holder 4, again embodied as sheet metal securement 26, is strapped onto the measuring tube with clamping bands 24. Slits 30 (FIG. 2) in the sheet metal securement 26 have the same, earlier described function and effect as in the case of the mounting of sheet metal securement 26 with U-bolts.

Figure 4:
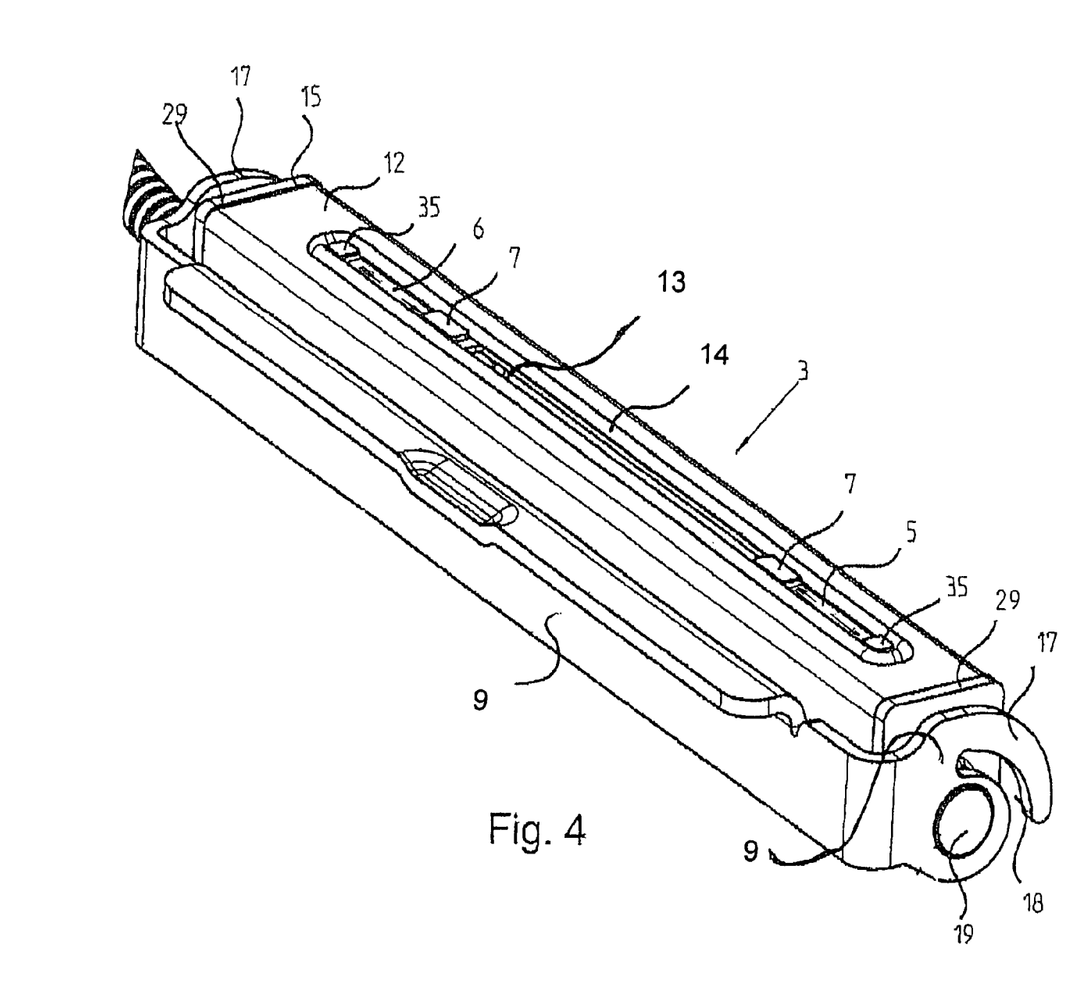
FIG. 4 shows perspectively, a sensor housing with sealing lip.
Figure 5:
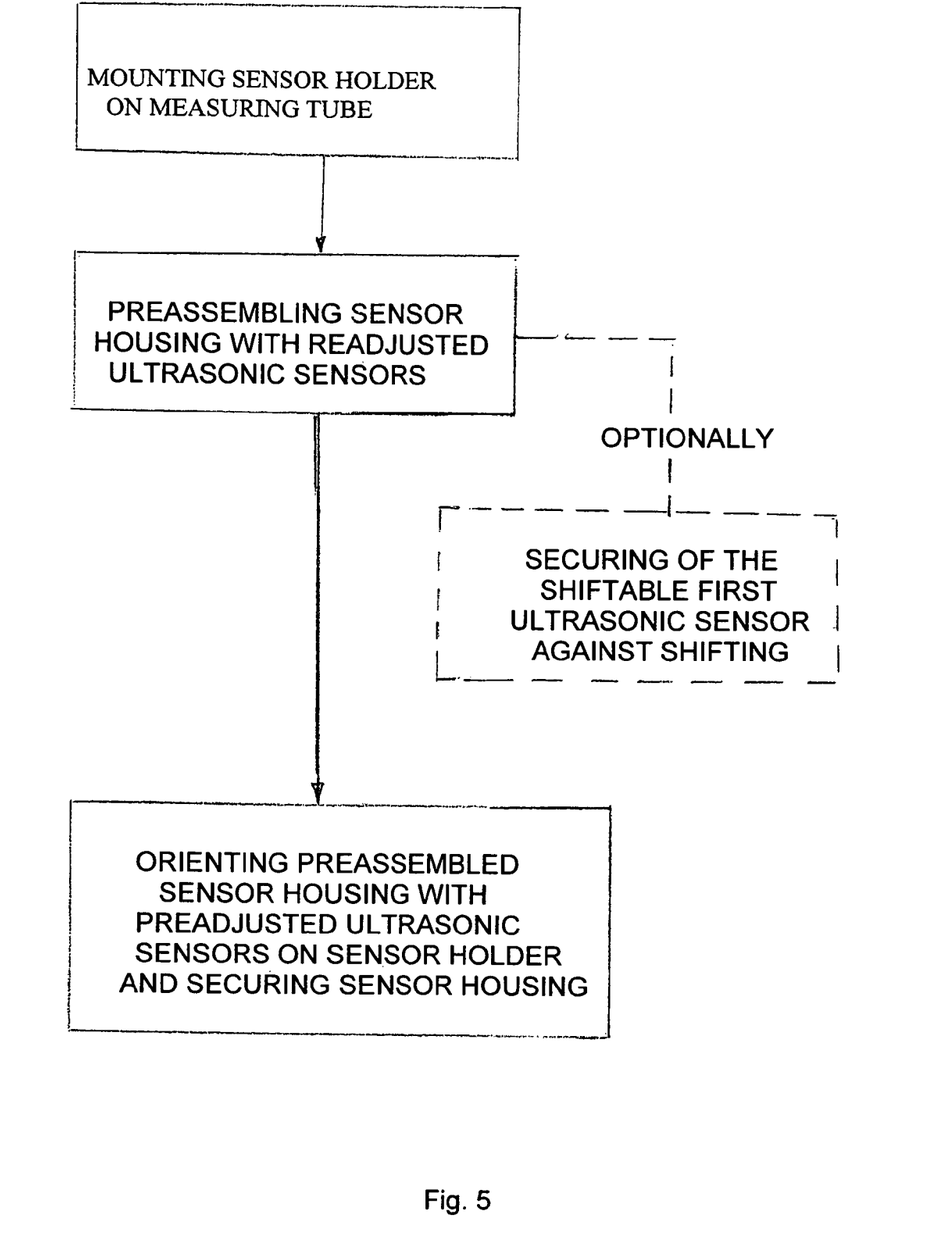
FIG. 5, is a block diagram which shows the method steps of the invention.

FIG. 4 shows a sensor housing 3 with a window 13, an ultrasonic sensor 5 shiftable in the window 13 and a clamping hanger 17 seated rotatably around the rotation axis 19 and equipped with eccentric cutouts 18. Window 13 in the first sensor housing wall 12 is provided with a seal 14. Seal 14 extends around the window 13 on the outwardly lying side of the first sensor housing wall 12. Wall 12 faces the measuring tube 2 in the mounted state. Seal 14 lies, in the mounted state of the measuring system, between measuring tube 2 and sensor housing 3 and seals window 13, so that no dirt, dust, water spray or the like can get into the sensor housing 3 or contaminate the coupling grease applied, in given cases, on the measuring tube 2. The seal also protects the coupling grease against e.g. solar radiation.

Except for window 13, sensor housing 3 is sealed off from the environment. Sensor housing 3 preferably comprises a square tube with end caps 29, which seal the square tube on its ends. The end caps 29 extend in this embodiment on the side of the housing formed by the first sensor housing wall 12 somewhat outwards and so form stops 15 of height h. If the sensor housing 3 is pressed toward a measuring tube 2, the end caps 29, i.e. the stops 15 directly contact measuring tube 2. The the sensor housing wall 12 facing measuring tube has, thus, a separation h from the measuring tube. The seal 14 lying therebetween is compressed up to this separation h. The ultrasonic sensors 5, 6 each have a sound in-coupling, sound out-coupling, surface 7, via which the ultrasonic measurement signal is coupled into the measuring tube 2, or out of the measuring tube 2, as the case may be, and a support surface 35, which lies coplanarly with the sound in-coupling, or sound out-coupling, surface 7. Surfaces 7, 35 protrude likewise in the not mounted state out beyond the first sensor housing wall 12. In the mounted state, the two surfaces 7, 35 are in contact with the measuring tube 2. Corresponding to the height h of the stop 15, the ultrasonic sensors 5, 6 are also shifted into the sensor housing 3. The ultrasonic sensors 5, 6 are preferably seated resiliently in the sensor housing 3.

The interior of the sensor housing 3 is only accessible to the user via the window 13. Since the window 13 in the mounted state of the measuring system 1 is, however, sealed, the sensors 5, 6 are then no longer accessible to the user. Thus, no shifting of the ultrasonic sensors 5, 6 with their sensitive sound in- and out-coupling surfaces 7 is possible on the measuring tube 2, this meaning thus that these sensitive surfaces are then safe from externally originating, mechanical damage, such as e.g. scratching.

The sensor housing 3 is mounted on the sensor holder 4 with the first sensor housing wall 12 facing in the direction of the measuring tube 2. In this regard, the clamping hanger 17 must be rotated from the illustrated end position into a start position. The open end of the eccentric cutout 18 thus points in the end position, thus in the mounted state, away from the measuring tube 2, and, respectively, away from the sensor housing wall 12.

As evident in FIGS. 1 to 4, the sensor housing 3 and sensor holder 4 are embodied in such a manner, that the sensor housing 3 is orientable toward the measuring tube 2 and releasably fixable in the sensor holder 4. For this purpose, the sensor housing 3 is inserted into a window 16 between the lugs 28 of the sensor holder 4. The clamping hanger 17 is, in such case, in the start position. By rotating the clamping hanger 17 to the end position, the clamping hanger 17 engages with its eccentric cutout 18 into the leaf spring 20 with the pin 31. The eccentric cutout 18 is thus guided around the pin 31. Through the eccentricity of the cutout 18, upon the rotation of the clamping hanger 17, the sensor housing 3 is drawn in the direction of measuring tube 2, and thus pressed onto the measuring tube 2. In such case, the seal 14 is compressed to the height h of the stop 15, this thus meaning that it seals the sensor housing 3 against the measuring tube 2, and the ultrasonic sensors 5, 6, which in the non-installed state protrude out of the sensor housing 3 beyond the height h, are likewise shifted into the sensor housing 3 to the height h of the stop, with which they protrude in the installed state beyond the sensor housing wall 12. Before applying the sensor housing 3, a coupling mat (not shown) is placed between the sensor housing 3 and the measuring tube 2, or coupling grease is placed between the sensor housing 3 and measuring tube 2. Through the elastic effect of the leaf spring 20, the sensor housing 3 is releasably fixed on the measuring tube with a predetermined force, and assures the lying of the sensor housing 3 against the measuring tube 2. At the same time, the sensor holder 4, as a metal securement sheet 26, is equipped with slits 30, so that the forces with which the metal securement sheet 26 is held on the measuring tube 2 are decoupled from the securement mechanism 9 of the sensor housing 3 on the metal securement sheet 26 or on the measuring tube 2. Through the shape of the eccentric cutout in the clamping hanger, the elastic securement of the sensor housing 3 on the sensor holder 4 or on the measuring tube 2 is self-locking.

Besides the securement mechanism 9 with the illustrated clamping hanger 17, which, together with the leaf spring 20, forms the securement mechanism 9, other securement mechanisms 9 can be used. Thus, the sensor housing can, for example, be secured to the measuring tube by means of resilient clamping bands or the securement occurs by means of magnets on the sensor holder and/or on the sensor housing or the sensor housing engages with spring elements provided on the sensor holder, similarly to a lock of a cable binding or of a toggle switch, whereby with increased pulling force it could be removed again.

Conversely is the clamping hanger also on the sensor holder 4 rotatable seatably and corresponding pins, in which the clamping hanger then engage can, be on the sensor housing placed. Thus, would only the parts of the securement mechanism immersed, the function would remain the same.

Sensor holder 4 are for different large measuring tubes 2 special manufacturable or they possess a sufficiently large prismatic cavity for placing on different large pipes.

LIST OF REFERENCE CHARACTERS 1 flow measuring system
2 measuring tube
3 sensor housing
4 sensor holder
5 first ultrasonic sensor
6 second ultrasonic sensor
7 surface, area for ultrasound coupling in/out
8 control/evaluation unit
9 securement mechanism
10 first functional surface
11 second functional surface
12 first sensor housing wall
13 window in the sensor housing
14 seal
15 stop
16 window in the sensor holder
17 clamping hanger
18 eccentric cutout of the clamping hanger
19 rotation axis of the clamping hanger
20 leaf spring with pin
21 connection cable
22 connection plug
23 U-bolt
24 clamping band
25 measured medium
26 sheet metal securement
27 prismatic cavity
28 lugs
29 end cap 30 slit in the sheet metal securement
31 pin in the leaf spring
32 region for accommodating the securement means
33 bore
34 clamping band guide
35 support surface

The invention claimed is:

1. A measuring system for determining and/or monitoring flow of a measured medium through a measuring tube, comprising:
   a sensor holder which is securable on the measuring tube and includes a securement mechanism for releasable securement of a sensor housing on said sensor holder;
   at least one control/evaluation unit, which, based on ultrasonic measurement signals, or based on measurement data derived from the ultrasonic measurement signals, ascertains volume, and/or mass flow of the measured medium flowing in the measuring tube;
   a first ultrasonic sensor; and
   at least a second ultrasonic sensor, wherein;
   said sensor housing surrounds said first and second ultrasonic sensors;
   at least said first ultrasonic sensor is seated shiftably in said sensor housing;
   said sensor housing forms with said ultrasonic sensors a unit securable on said sensor holder and releasable from said sensor holder; and
   said sensor holder is in the form of a sheet metal securement with a prismatic cavity on a side facing the measuring tube for orientation of said sensor holder on the measuring tube and has a centrally arranged window and thereon attached lugs for accommodating and orienting said sensor housing on the measuring tube.

2. The measuring system as claimed in claim 1, wherein:
   said sensor housing has on a sensor housing wall facing the measuring tube a window, through which at least said first ultrasonic transducer at least partially protrudes out from said sensor housing.

3. The measuring system as claimed in claim 1, further comprising:
   a seal arranged between the measuring tube and said sensor housing on said sensor housing wall facing the measuring tube.

4. A method for mounting a measuring system as claimed in claim 3, comprising the steps of:
   mounting the sensor holder on the measuring tube;
   preassembling the sensor housing with therein preadjusted ultrasonic sensors;
   orienting the already preassembled sensor housing with therein preadjusted ultrasonic sensors on the sensor holder and then securing the sensor housing; and
   compressing the seal between the sensor housing wall and the measuring tube.

5. The method for mounting a measuring system as claimed in claim 4, wherein:
   simultaneously with the securement of the sensor housing on the sensor holder at least the shiftable first ultrasonic sensor is secured against shifting.

6. The measuring system as claimed in claim 1, wherein:
   said sensor housing has a sensor housing wall which faces the measuring tube and has on said sensor housing wall facing the measuring tube, between said sensor housing wall and the measuring tube, at least one stop, which, in the mounted state of the measuring system, lies against the measuring tube and defines between said sensor housing wall and the measuring tube a distance h, up to which at least said first ultrasonic sensor protrudes in the mounted state out from said sensor housing.

7. The measuring system as claimed in claim 1, wherein:
   said sensor holder has a first functional surface for orientation of said sensor holder on the measuring tube.

8. The measuring system as claimed in claim 1, wherein:
   said sensor holder has at least a second functional surface for orientation of said sensor housing on said sensor holder.

9. The measuring system as claimed in claim 1, wherein:
   said sensor holder is mountable with a definable first force on the measuring tube and said sensor housing is mountable with a definable second force independent of the first force, which second force is introducible onto the measuring tube via the securement mechanism between said sensor holder and said sensor housing.

10. The measuring system as claimed in claim 1, wherein:
    at least said first ultrasonic sensor, said shiftable in said sensor housing is, upon securing of said sensor housing to said sensor holder, securable against shifting.

11. A measuring system for determining and/or monitoring flow of a measured medium through a measuring tube, comprising:
    a sensor holder which is securable on the measuring tube and includes a securement mechanism for releasable securement of a sensor housing on said sensor holder;
    at least one control/evaluation unit, which, based on ultrasonic measurement signals, or based on measurement data derived from the ultrasonic measurement signals, ascertains volume, and/or mass flow of the measured medium flowing in the measuring tube;
    a first ultrasonic sensor;
    at least a second ultrasonic sensor; and
    a seal arranged between the measuring tube and said sensor housing on said sensor housing wall facing the measuring tube, wherein:
    said sensor housing surrounds said first and second ultrasonic sensors;
    at least said first ultrasonic sensor is seated shiftably in said sensor housing;
    said sensor housing forms with said ultrasonic sensors a unit securable on said sensor holder and releasable from said sensor holder; and
    said sensor housing has on said sensor housing wall facing the measuring tube, between said sensor housing wall and the measuring tube, at least one stop, which, in the mounted state of the measuring system, lies against the measuring tube and defines between senaor housing wall and the measuring tube a distance h, up to which distance h said seal is compressable between said sensor housing wall and the measuring tube.

12. A measuring system for determining and/or monitoring flow of a measured medium through a measuring tube, comprising:
    a sensor holder which is securable on the measuring tube and includes a securement mechanism for releasable securement of a sensor housing on said sensor holder;
    at least one control/evaluation unit, which, based on ultrasonic measurement signals, or based on measurement data derived from the ultrasonic measurement signals, ascertains volume, and/or mass flow of the measured medium flowing in the measuring tube;
    a first ultrasonic sensor; and
    at least a second ultrasonic sensor, wherein:
    said sensor housing surrounds said first and second ultrasonic sensors;

at least said first ultrasonic sensor is seated shiftably in said sensor housing;

said sensor housing forms with said ultrasonic sensors a unit securable on said sensor holder and releasable from said sensor holder;

said securement mechanism includes a leaf spring, which is an integral component of said sensor holder or which is connectable with said sensor holder, and a clamping hanger, which is rotatably seated on said sensor housing and which ha an eccentric cutout; and by engagement of said eccentric cutout in said leaf spring, a force is appliable in the direct of the measuring tube upon rotation of said clamping hanger on said sensor housing.

* * * * *